H. L. DE ZENG.
OPTICAL INSTRUMENT.
APPLICATION FILED JULY 28, 1913.
1,115,408.
Patented Oct. 27, 1914.
2 SHEETS—SHEET 1.
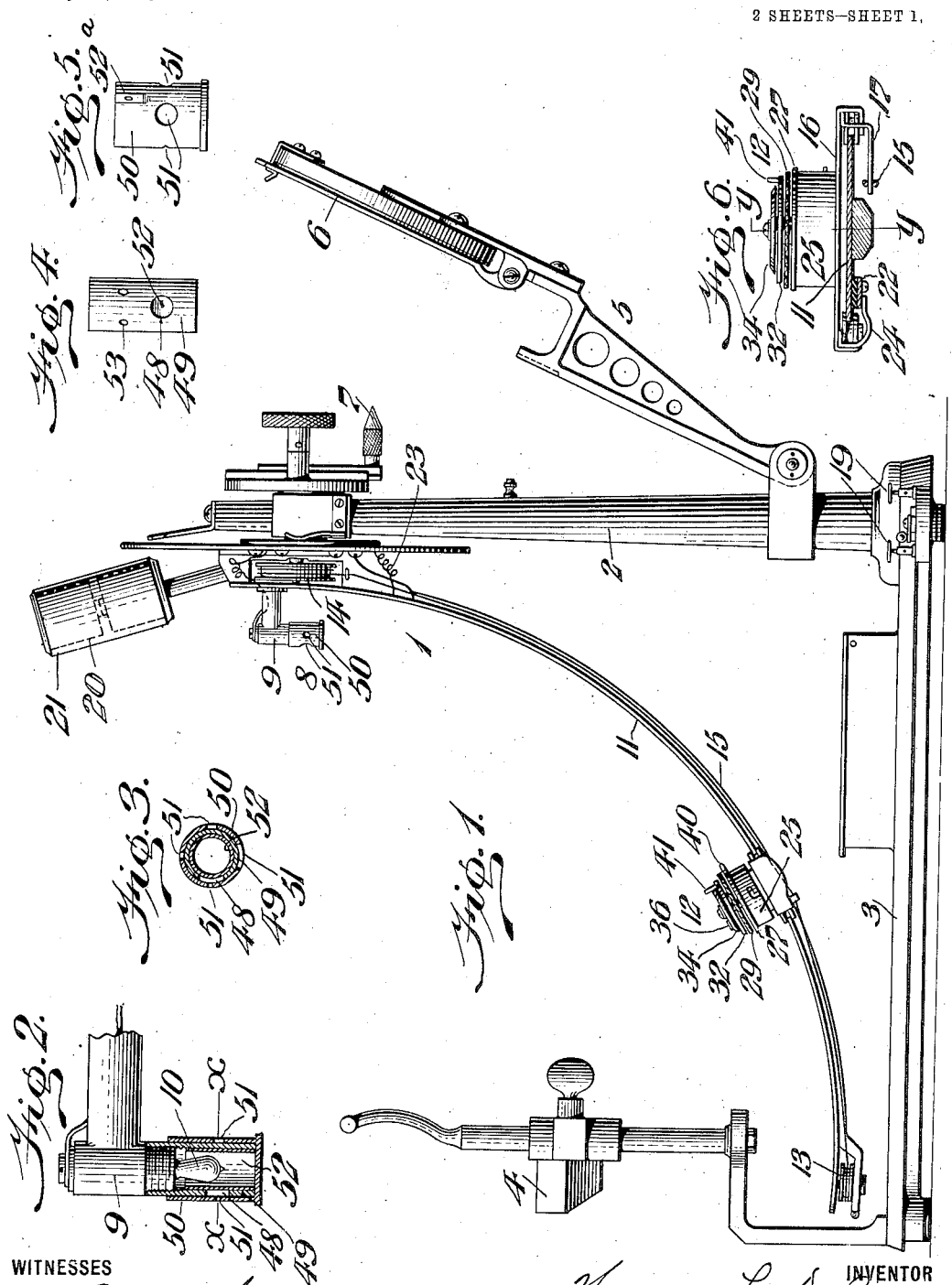

H. L. DE ZENG.
OPTICAL INSTRUMENT.
APPLICATION FILED JULY 28, 1913.
1,115,408.
Patented Oct. 27, 1914.
2 SHEETS—SHEET 2.
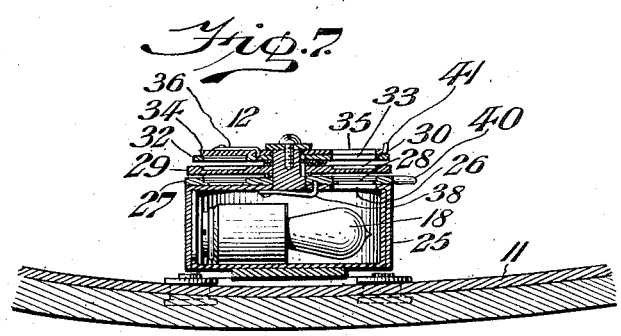
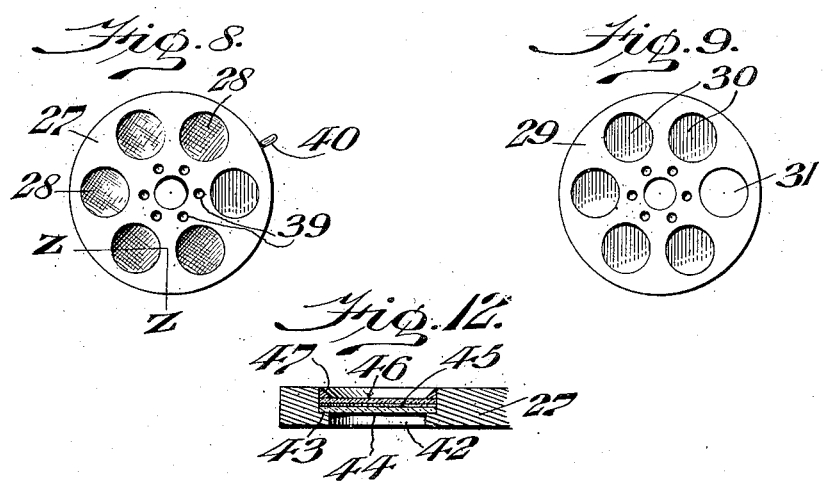
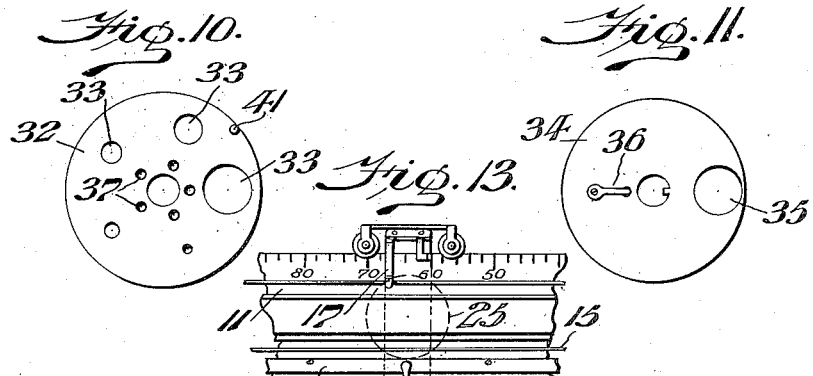
WITNESSES
H. T. Dieterich
P. F. Nagle
INVENTOR
Henry L. De Zeng,
BY
Wiedersheim & Fairbanks,
ATTORNEYS

UNITED STATES PATENT OFFICE.

HENRY L. DE ZENG, OF MAPLE SHADE, NEW JERSEY.

OPTICAL INSTRUMENT.

1,115,408.  Specification of Letters Patent.  Patented Oct. 27, 1914.

Application filed July 28, 1913. Serial No. 781,497.

*To all whom it may concern:*

Be it known that I, HENRY L. DE ZENG, a citizen of the United States, residing at Maple Shade, in the county of Burlington, State of New Jersey, have invented a new and useful Optical Instrument, of which the following is a specification.

My invention relates to a novel and useful optical instrument known as a perimeter wherein I have provided means whereby the instrument may be used with either reflected or transmitted light in different colors.

It further consists of an optical instrument such as a perimeter having a point of fixation and a test object movably mounted with respect thereto, and means carried by said test object for both reflecting or transmitting light, in different colors, therefrom.

It further consists of an optical instrument such as a perimeter having a new and novel point of fixation having means for varying the size thereof, as may be required.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, athough it is to be understood that the various instrumentalities of which my invention consists can be variously arranged and organized and that my invention is not limited to the precise arrangement and organization of these instrumentalities as herein shown and described.

Figure 1 represents a side elevation of a perimeter embodying my invention. Fig. 2 represents a partial elevation and partial sectional view of a point of fixation employed. Fig. 3 represents a sectional view on line x—x Fig. 2. Figs. 4 and 5 represent side elevations of portions of the rotatable members employed with the point of fixation. Fig. 6 represents a transverse sectional view of the test object and support therefor. Fig. 7 represents a sectional view on line y—y Fig. 6. Figs. 8, 9, 10 and 11 represent plan views of means employed with the test object for reflecting or transmitting colored rays of light. Fig. 12 represents a sectional view on line z—z Fig. 8, on an enlarged scale. Fig. 13 represents a bottom plan view of the carrier and a portion of its support.

My invention is designed to provide means for either reflecting or transmitting light in different colors from the test object of a perimeter, and in the drawings, I have shown a construction embodying my invention, in which the same is shown as applied to what is known as the McHardy style or type of perimeter and which I have found operates successfully in practice, but it is, of course, to be understood that the arrangement of the parts may be varied and other instrumentalities may be employed, which will come within the scope of the invention, and I do not therefore desire to be limited, in every instance, to the exact form as herein shown and described, but desire to make such changes as may be necessary, as well as to employ the invention with any form of perimeter to which it may be applicable.

Similar numerals of reference indicate corresponding parts in the figures.

Referring to the drawings,—1 designates a perimeter having a standard 2 supported on a base 3 and having a chin-rest 4, also suitably supported by the base 3, and in suitable relation with respect to the standard 2. Pivotally mounted in suitable relation to the standard 2 is a frame or arm 5 carrying the chart-holder and chart 6 which serve to indicate the relative position of the test object with the point of fixation.

7 designates a recording pointer, here shown as suitably mounted upon the standard and in proper relation with respect to the chart in order that the notations may be suitably made upon the chart.

8 designates a point of fixation here shown as suitably supported upon the standard 2, and which, in the present instance, is composed of a support or member 9 having means for connection with a suitable source of light 10, such as a lamp, further details of the construction of the point of fixation will be hereinafter fully set forth.

11 designates an arm or arc rotatably or movably mounted upon the standard 2 in suitable relation with respect to the point of fixation 8 and which arm, as here shown is curved, although the arm may be of any suitable shape and size. Movably or adjustably mounted upon said arm 11 is a test object 12, which it will be understood is adapted to be carried by said arm 11 in its rotation or movement with respect to the said point of fixation 8 and is adapted to be moved or adjusted upon said arm 11 toward or away from the point of fixation 8, in order that the said test object 12 may be moved through different meridians lying at angles with the line of the patient's vision, in order than every portion of the retinal field is in turn covered or traversed by said test object and consequently any areas having a lack of perception or color sense may be definitely determined and approximately located. Any suitable means for moving or adjusting the position of said test object upon the arm 11 may be employed, and as here shown, I have mounted upon the said arm 11, the pulleys or rollers 13 and 14 around which pass a suitable cable 15 in suitable connection with the test object 8, it being understood that suitable motion may be imparted to said rollers by any proper or suitable means in order to provide for the movement or adjustment of the said test object on its support.

As here shown, I have mounted the test object 12 upon a carrier 16 movably mounted on the arm 11 and connected with the cable 15 by a member 17. The test object is provided with a source of light 18, such as a lamp, and any suitable means for conducting current to said lamp may be employed. For this purpose I have shown the binding posts 19, any number of which may be provided, carried by the perimeter, to which conductors or wires may be connected, if it is desired to have the source of current-supply extraneous of the instrument but the instrument may be provided with a self-contained source of current-supply, in which event, I may locate one or more batteries 20 (shown in dotted lines) in a casing 21, which will serve as a counterpoise and which is carried or connected with the bar 11. In order to supply current to one or more of the lamps on the instrument, I have here shown a metal plate 22 supported upon the arms 11 but insulated therefrom and to which plate 22, I connect a wire or conductor 23, which is in suitable connection with the source of current-supply, and upon the carriage 16 of the test object I mount a contact piece or finger 24, which is adapted to contact with the plate 22, and is in suitable connection with the test object in order that the current will be suitably directed to the contact member of the lamp 18.

Removably connected in any suitable manner, as for example a bayonet joint as illustrated, with the carrier 16 is the test object, here shown as consisting of a casing or box 25, in which is mounted the source of light 18, and in the upper portion of the box, I provide a light opening 26 in suitable relation to the source of light or lamp 18, in order that the rays of light therefrom will be passed through said light opening 26. Upon the casing or box 25, I movably mount the light filters and color reflectors in any suitable or desired manner, in order that they will be so supported that they may be suitably brought to operative position in order that the light filters will transmit the light from the light source in different colors, and in order that the color reflecting substance may be suitably located in operative position to reflect light. To this end, I rotatably mount a disk 27 in a suitable manner upon the casing 25, which disk is provided with a plurality of light filters 28 of different colors, in order that by the rotation of said disk 27 the different light filters are successively brought into operative position with respect to the light opening 26, in order that the rays of light from the light source 18 will be transmitted therethrough in different colors. Also mounted upon the casing 25 is a disk 29 carrying the color reflectors which consist of a series of members 30 of different colors, and mounted in suitable openings in the disk, which are adapted to reflect light. One of the openings of this disk, as 31, is left blank or is free from the color reflecting medium, in order that the same may be properly positioned with respect to the light opening, so that the light filters, when brought into operative position with the light disk 26, may transmit the light therethrough. I also mount a disk 32 upon said casing 25, which is provided with a series of openings 33 of different or varying sizes, in order that the said disk 32 may be moved to bring one of the openings 33 into operative position with respect to the color reflectors or the light filters, to vary the size of the openings and consequently the apparent size of the object. Above the disks, I stationarily mount a plate or disk 34, which is provided with a sight opening 35, said disk 34 serving as a cap with a fixed size opening, serving as a sight opening, and which is always, therefore, held in proper relation with respect to the light opening. Any suitable means for temporarily holding the disks in their different positions may be employed. As here shown, I provide a spring member 36 upon the cap 34, which engages with suitable recesses or openings 37 in the disks 32, and I may also provide a spring member 38 which engages with suitable openings or recesses 39 in the disk 27, for holding the same in its different positions. A finger-piece 40 is also provided on the disk 27 for ease of operation, while a finger-piece 41 is provided on the disk 32 for operating this disk.

Any suitable means for mounting the light filters in the disk may be employed. As here shown, with special reference to Fig. 12, I form the openings 42 in the disk 27 with a shoulder 43, and upon the same I rest a transparent protective plate 44 upon which is supported the light filter 45, which is preferably covered by a transparent plate 46, serving to protect the light filter 45. A ring, or other suitable means, 47, is employed for securely holding the light filter and plates in position in the opening. The point of fixation, which is stationarily mounted upon the standard 2 is likewise provided with a light opening in suitable relation to the source of light or lamp 10, carried by the said point of fixation, and this light opening 48 is preferably formed in a tube 49, which is in suitable engagement with the point of fixation 8, and rotatably mounted upon said tube 49 is a sleeve 50, provided with a series of openings 51 of different or varying sizes, which openings 51 can be successively brought into register with the sight opening 49, in order to vary the size of the object I may, if desired, provide a light reducer, such as a translucent substance, which is shown at 52, in Fig. 2, within the tube 49 and serving to modify or reduce the light from the lamp 10. By this means, it will be understood that the point of fixation has a light opening and is further provided with means for varying the size of said opening, as may be desired.

From the above, it will be understood that I provide the perimeter with a point of fixation having a light opening, the size of which may be varied, and by means of the source of light 10, rays of light can be caused to emanate from the sight opening, in order that the perimeter may be employed in a dark room. I also provide a point of fixation which will reflect light by reason of the light reducer 52 which is generally of a white substance, showing through the stated openings when the source of light 10 is inoperative. A test object is provided which is movably supported with respect to said point of fixation and I provide color reflectors thereon, in order that the light may be reflected therefrom and I further provide the test object with a source of light 18 and with light filters, which are adapted to be positioned into operative relation with respect to said source of light, in order that the light in different colors will be transmitted from the test object, so that the perimeter is adapted for use in a dark room, as will be evident.

It will be apparent that by rotating the disk 32 the size of the object may be varied, and when the perimeter is used in the light, the proper color reflector 30 may be brought into operative position with respect to the opening 35, in order that the proper color may be reflected to the eye of the patient undergoing the test. When the perimeter is used in the dark, the opening 31 in the disk 29 is suitably positioned with respect to the light opening 26, after which the proper light filter carried by the disk 27 is moved to operative position with respect to the light opening 26 and the opening 35, in order that light in color may be transmitted therefrom. Any suitable means for temporarily holding the sleeve 50 in its operative positions on the tube 49 may be employed. As here shown, I have provided a spring member 52ª, adapted to operate in openings or recesses 53 for this purpose.

At any suitable point, I provide means for indicating the relative position of the test object with respect to the point of fixation, and as shown, I have here provided a scale on the lower face of the arm 11, as shown in Fig. 13, for this purpose.

While I have shown but one test object containing both the daylight and electric light tests (reflected and transmitted) it will be understood that I may accomplish the desired results in any suitable manner, whereby either reflected or transmitted light will be obtained.

Having thus described my invention what I claim as new and desire to secure by Letters Patent, is:—

1. In an optical instrument, a suitable support, a point of fixation carried thereby, a test object carrier movably supported with respect to said point of fixation, and means for interchanging on said carrier means for reflecting or transmitting light therefrom.

2. In a perimeter, a suitable support, a point of fixation carried thereby, a test object, and means carried by said test object for either reflecting or transmitting light therefrom.

3. In a perimeter, a suitable support, a point of fixation carried thereby, a test object, a source of light carried by said test object, and means carried by said test object for either reflecting or transmitting light in different colors.

4. In a perimeter, a suitable support, a point of fixation carried thereby, a test object movably supported with respect to said point of fixation, an electric lamp carried by said test object, and means carried by said test object for either reflecting or transmitting light in different colors.

5. In a perimeter, a suitable support, a point of fixation carried thereby, a test object movably supported with respect to said point of fixation, an electric lamp carried by said test object, a disk movably mounted on said test object, color transmitting media mounted on said disk and adapted to be moved to operative position, a second disk movably mounted on said test object, and color reflecting media mounted on said disk and adapted to be moved to operative position.

6. In a perimeter, a suitable support, a point of fixation carried thereby, a test object movably mounted with respect to said point of fixation, a source of light carried by said test object, a light opening, light filters, color reflecting means, and means for supporting said light filters and said color reflecting means whereby the same may be brought to operative position with respect to said point of fixation.

7. In a perimeter, a suitable support, a point of fixation carried thereby, a test object movably mounted with respect to said point of fixation, a source of light carried by said test object, a sight opening, a light opening, light filters, color reflecting media, and means for either locating the different filters with respect to said sight opening and said light opening, whereby light from said light source will be transmitted in different colors, or for locating the different color reflecting media in operative position with respect to said sight opening, whereby the colors will be reflected therefrom.

8. In a perimeter, a suitable support, a point of fixation, a test object movably supported with respect to a point of fixation, and means carried by said point of fixation for either reflecting or transmitting light therefrom.

9. In a perimeter, a suitable support, a point of fixation adapted to reflect or transmit light, a test object, movably supported with respect to said point of fixation, having a light opening, a source of light suitably mounted with respect to said light opening, and means for varying the amount of light transmitted by said light opening.

10. In a perimeter, a suitable support, a point of fixation, a source of light suitably carried by said point of fixation, a test object and a second source of light suitably carried by said test object, means carried by said test object for transmitting or for reflecting light in different colors, and means for indicating the relative position of said test object with respect to said point of fixation.

11. In a perimeter, a suitable support, a point of fixation adapted to either reflect or transmit light, a test object, means carried by said test object for reflecting light in different colors, and means for indicating the relative position of said test object with respect to said point of fixation.

12. In a perimeter, a suitable support, a luminous point of fixation, means for governing the diameter of said luminous point of fixation, an adjustable test object having means for either transmitting or reflecting light in different colors, means for altering the relative position of said test object and said point of fixation, and means for determining the said relative position of said test object and said point of fixation.

HENRY L. DE ZENG.

Witnesses:
R. HOLDRIDGE,
F. WM. FRITZ.